(12) United States Patent
Nakagaito et al.

(10) Patent No.: US 9,719,561 B2
(45) Date of Patent: Aug. 1, 2017

(54) DAMPER DEVICE

(71) Applicant: AISIN SEIKI KABUSHIKI KAISHA, Kariya-shi, Aichi (JP)

(72) Inventors: Satoshi Nakagaito, Kariya (JP); Tomohiro Saeki, Anjo (JP); Yusaku Nishio, Chiryu (JP); Hiroshi Kawazoe, Kariya (JP); Miki Torii, Nishio (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 30 days.

(21) Appl. No.: 14/774,066

(22) PCT Filed: Jan. 24, 2014

(86) PCT No.: PCT/JP2014/051578
§ 371 (c)(1),
(2) Date: Sep. 9, 2015

(87) PCT Pub. No.: WO2014/148105
PCT Pub. Date: Sep. 25, 2014

(65) Prior Publication Data
US 2016/0040723 A1    Feb. 11, 2016

(30) Foreign Application Priority Data
Mar. 19, 2013    (JP) .................................. 2013-056875

(51) Int. Cl.
*F16D 3/14*    (2006.01)
*F16D 3/12*    (2006.01)
(Continued)

(52) U.S. Cl.
CPC ................. *F16D 3/12* (2013.01); *F16D 3/64* (2013.01); *F16D 7/025* (2013.01);
(Continued)

(58) Field of Classification Search
CPC ...... F16D 3/12; F16D 3/64; F16D 7/02; F16F 15/123; F16F 15/134
(Continued)

(56) References Cited

U.S. PATENT DOCUMENTS 3,138,039 A * 6/1964 Zeidler ............. F16F 15/12366
192/205 X
4,351,168 A * 9/1982 Prince ....................... F16F 1/12
192/205
(Continued)

FOREIGN PATENT DOCUMENTS

JP    43-009505 B1    4/1968
JP    58-112740 U     8/1983
(Continued)

OTHER PUBLICATIONS

Official Action issued Nov. 24, 2015 in corresponding Japanese Patent Application No. 2013-056875, with English translation (7 pages).
(Continued)

*Primary Examiner* — Gregory Binda
(74) *Attorney, Agent, or Firm* — Buchanan Ingersoll & Rooney PC

(57) ABSTRACT

A damper device includes a first member, a second member, an elastic member and a supporting member. The first member has two wall members separated from each other. The supporting member includes projections (preventing portion) that make contact with one of two wall portions (wall members) so as to prevent the supporting member and an elastic member from being inclined (falling, rotationally moving) in the axial direction.

8 Claims, 4 Drawing Sheets

(51) Int. Cl.
*F16F 15/123* (2006.01)
*F16F 15/134* (2006.01)
*F16D 3/64* (2006.01)
*F16D 7/02* (2006.01)

(52) U.S. Cl.
CPC .... *F16F 15/1234* (2013.01); *F16F 15/12353* (2013.01); *F16F 15/13453* (2013.01)

(58) Field of Classification Search
USPC ........................................ 464/68.92; 192/205
See application file for complete search history.

(56) References Cited

U.S. PATENT DOCUMENTS

| | | | |
|---|---|---|---|
| 4,451,244 A | 5/1984 | Lamarche | |
| 4,493,674 A | 1/1985 | Tamura et al. | |
| 4,537,579 A * | 8/1985 | Loizeau | F16D 13/686 |
| | | | 192/205 |
| 4,709,796 A * | 12/1987 | Uenohara | F16D 3/68 |
| | | | 192/205 |

FOREIGN PATENT DOCUMENTS

| | | |
|---|---|---|
| JP | 59-058232 A | 4/1984 |
| JP | 59-110940 A | 6/1984 |
| JP | 60-3328 U | 1/1985 |
| JP | 60-084429 A | 5/1985 |
| JP | 62-45428 U | 3/1987 |
| JP | 2002-013547 A | 1/2002 |

OTHER PUBLICATIONS

International Search Report (PCT/ISA/210) mailed on Mar. 4, 2014, by the Japanese Patent Office as the International Searching Authority for International Application No. PCT/JP2014/051578.

* cited by examiner

DAMPER DEVICE

CROSS-REFERENCE TO RELATED APPLICATIONS

This application is national stage application of International Application No. PCT/JP2014/051578, filed Jan. 24, 2014, which designates the United States, incorporated herein by reference, and which claims the benefit of priority from Japanese Patent Application No. 2013-056875, filed Mar. 19, 2013, the entire contents of which are incorporated herein by reference.

TECHNICAL FIELD

The present invention relates to a damper device.

BACKGROUND ART

Conventionally, damper devices including a first member rotating about a rotating axis, a second member rotating about the rotating axis, a plurality of coil springs (elastic members) that are interposed in an opening between the first member and the second member and are elastically deformed in the circumferential direction of the rotating axis, and supporting members that support the respective coil springs from both sides have been known (for example, Patent Document 1).

Patent Document 1: Japanese Patent Application Laid-open No. 2002-13547

DISCLOSURE OF INVENTION

Problem to be Solved by the Invention

In the above-mentioned damper devices, variable torque from a driving source is reduced by the elastic members interposed between the first member and the second member, as an example. In this case, the supporting members supporting the elastic members are easy to move in the axial direction when relative rotation is generated between the first member and the second member. In view of the circumstances, it is an object to configure the supporting members so as to be prevented from being inclined in the axial direction and be supported stably.

Means for Solving Problem

With the embodiment, the preventing portion makes contact with at least one of the two wall members and the second member so as to enable the supporting member and the elastic member to be supported more stably, as an example.

The damper device providing the above-mentioned result (effect) can be therefore embodied with a relatively simple configuration in which the preventing portion projects to between the two members out of the two wall members and the second member, as an example.

The damper device providing the above-mentioned result (effect) can be therefore embodied with a relatively simple configuration in which the recess into which one member out of the two wall members and the second member is inserted is provided on the preventing portion, as an example.

With this configuration, one member out of the two wall members and the second member is easier to be inserted into the recess than the case where the expansion portion is not provided, as an example.

With this configuration, the supporting member is made further difficult to be inclined in the axial direction, as an example.

With this configuration, a surface pressure on a portion on which the supporting member and a member with which the supporting member makes contact make contact with each other tends to be lower, as an example.

BEST MODES FOR CARRYING OUT THE INVENTION

Figure 1:
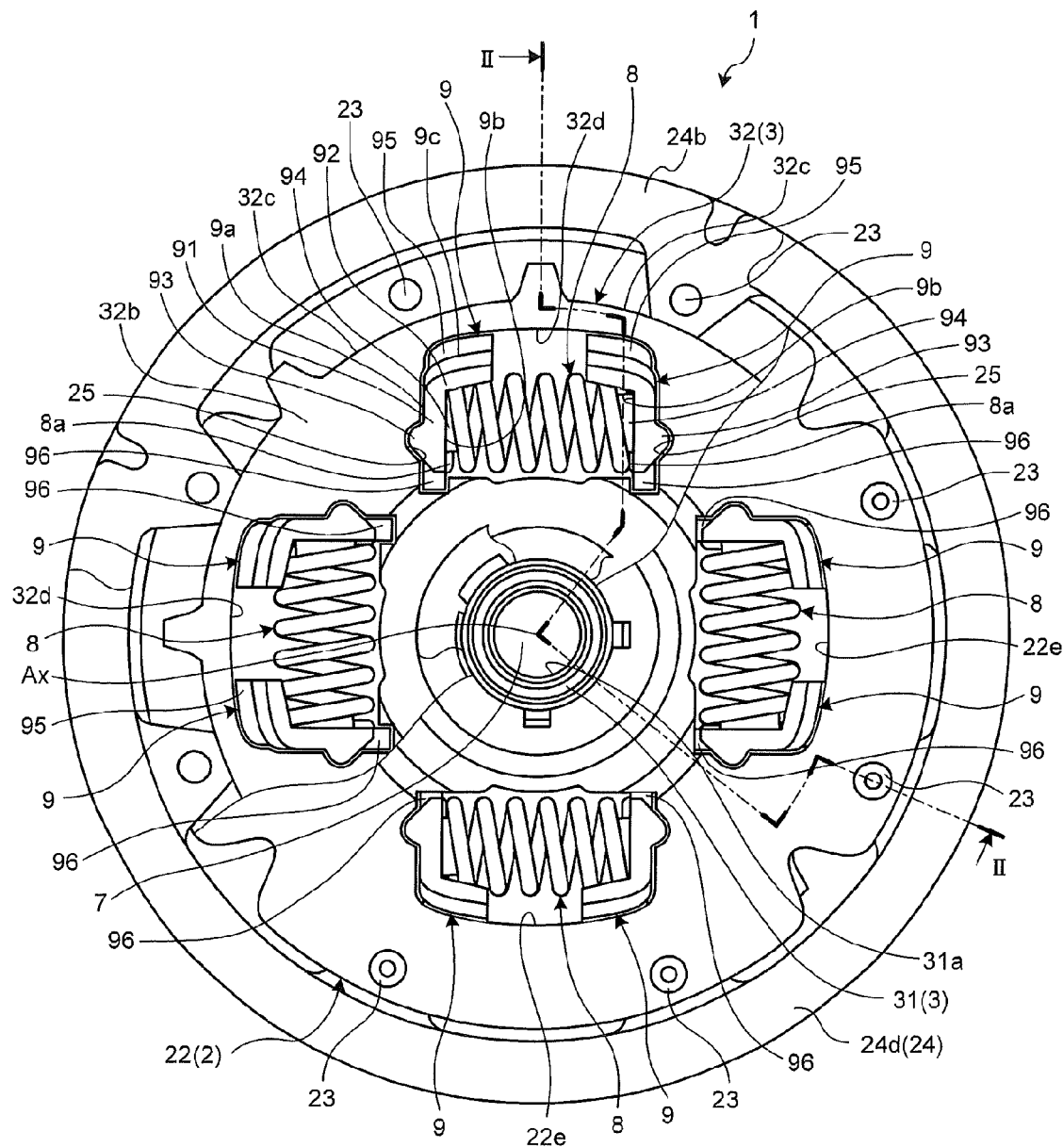
FIG. 1 is a front view (partial breakaway view) illustrating an example of a damper device according to an embodiment when seen from the axial direction.

The following embodiment and variations include similar configurations. Common reference numerals denote the similar configurations and overlapped description thereof is omitted.

Embodiment

Figure 2:
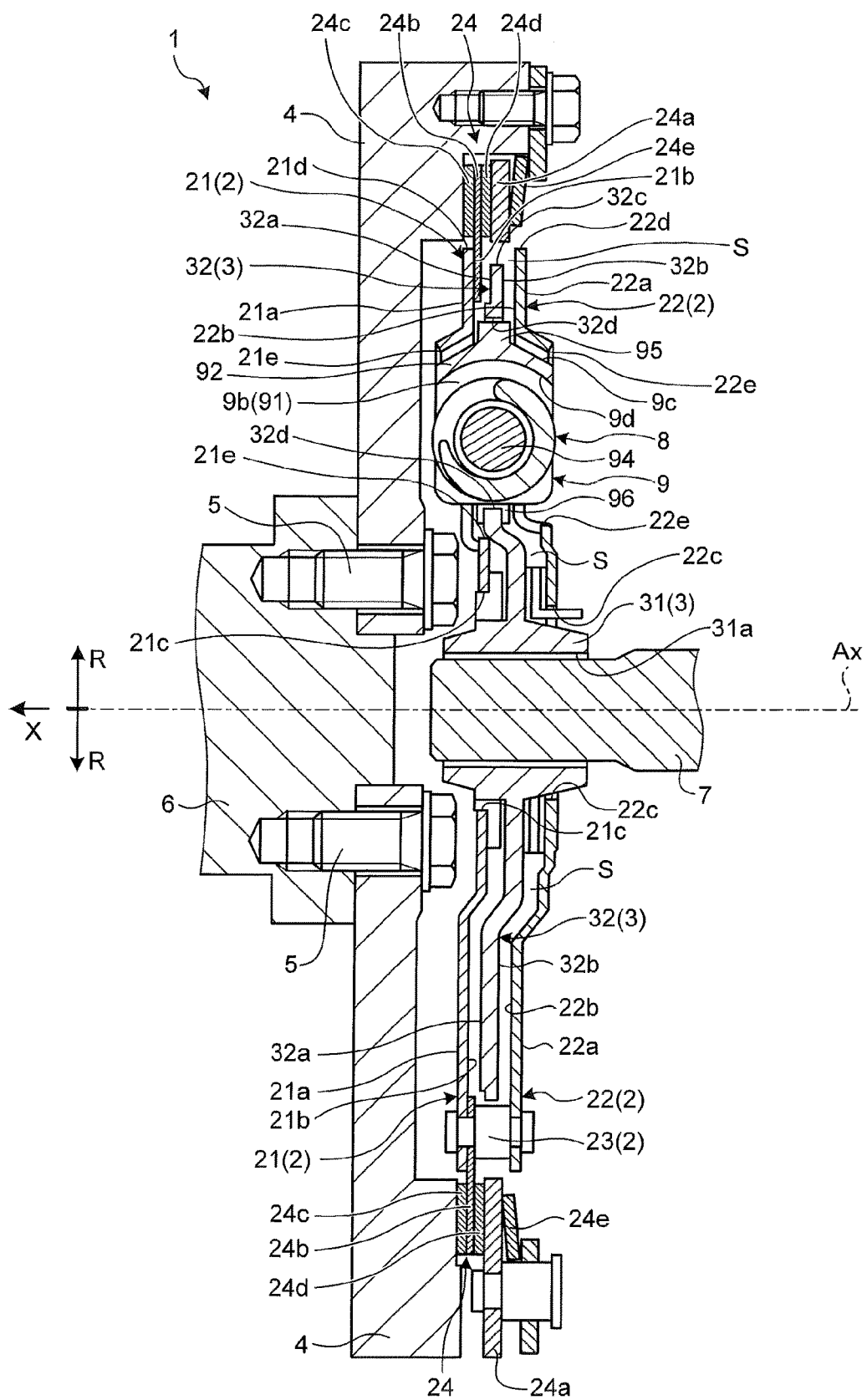
FIG. 2 is a sectional view cut along a line II-II in FIG. 1.

A damper device 1 according to the embodiment as illustrated in FIGS. 1 and 2 is located between an engine (power unit, not illustrated) and a transmission (speed gear, not illustrated), as an example. The damper device 1 can absorb (temporarily store) variation of driving force (torque, rotation). The damper device 1 is not limited to be provided between the engine and the transmission but can be provided between other two rotating elements (for example, between the engine and a rotating electric machine (motor generator). The damper device 1 can be provided on various vehicles (for example, hybrid car), machines having a rotating element, and the like.

In the embodiment, the damper device 1 is attached to a fly wheel 4 at a subsequent stage of the engine by coupling tools 5 (in the embodiment, screws as an example), as an example. A center axis Ax (rotating axis) of the damper device 1 corresponds to center axes of rotating bodies and rotary shapes (for example, a first member 2 (wall portions 21 and 22), openings 21c and 22c, a second member 3, and shafts 6 and 7) included in the damper device 1 or connected (coupled) thereto. In the following description, an axial direction corresponds to the axial direction of the center axis Ax, a radial direction corresponds to the radial direction of the center axis Ax, and a circumferential direction corresponds to the circumferential direction of the center axis Ax unless otherwise specified. Furthermore, in the following detail description, the engine side (left side in FIG. 2) in the axial direction is set to one side in the axial direction and the transmission side (right side in FIG. 2) in the axial direction is set to another side in the axial direction for the convenience. In the individual drawings, one side in the axial direction is indicated by an arrow X and the outer side in the radial direction is indicated by an arrow R. FIG. 1 is a view of the damper device 1 when seen from the another side in the axial direction (when seen from the right side in FIG. 2).

In the embodiment, the damper device 1 includes the first member 2 and the second member 3, as an example.

In the embodiment, the first member 2 includes a wall portion 21 (wall member), and a wall portion 22 (wall member), as an example. The two wall portions 21 and 22 are located so as to be separated from each other in the axial direction and a space S (gap) is provided between the two wall portions 21 and 22. A wall portion 32 of the second member 3 is located in the space S, that is, between the wall portion 21 and the wall portion 22. The wall portion 32 of the second member 3 can rotationally move (oscillate) relatively to the first member 2 in the space S.

In the embodiment, each of the wall portions 21 and 22 (plates) is configured to have a circular plate-like shape (circular ring-like shape), as an example. The wall portions 21 and 22 are extended along the radial direction. The wall portion 21 has a surface 21a and a surface 21b. The surface 21a faces one side in the axial direction and the surface 21b faces the other side in the axial direction. The wall portion 22 has a surface 22a and a surface 22b. The surface 22a faces the other side in the axial direction and the surface 22b is located at the opposite side to the surface 22a and faces one side in the axial direction. Openings 21c and 22c are provided at the center portions of the wall portions 21 and 22, respectively. The openings 21c and 22c accommodate the shaft 7 and a part (supporting portion 31) of the second member 3. Furthermore, openings 21e and 22e (in the embodiment, through-holes as an example) are provided on the wall portions 21 and 22 at intermediate positions between the center axis Ax and outer edges 21d and 22d (end portions at the outer side in the radial direction), respectively. The wall portion 21 and the wall portion 22 are coupled to each other through coupling tools 23 (for example, rivets). In the embodiment, distances to the plurality of (in the embodiment, eight as an example) coupling tools 23 from the center axis Ax are the same, as an example. In the embodiment, the plurality of coupling tools 23 are arranged at a certain interval (angle, in the embodiment, equal interval as an example) in the circumferential direction, as an example. It should be noted that the positions, the number, and the like of coupling tools 23 can be changed appropriately. For example, the wall portions 21 and 22 can be made of a metal material (iron-based material, as an example).

In the embodiment, as illustrated in FIG. 2, the first member 2 (in the embodiment, the wall portion 21 as an example) is connected (coupled) to the fly wheel 4 through torque limiter portions 24, for example. Each torque limiter portion 24 includes members 24a and 24b and frictional members 24c and 24d. The member 24a is configured to have a circular ring-like and plate-like shape and is elastically pressed to one side in the axial direction by an elastic member 24e. The member 24b is configured to have a circular ring-like and plate-like shape. The frictional members 24c and 24d are fixed to both sides of the member 24b in the axial direction. The member 24b is coupled to the wall portion 21. The fly wheel 4 and the member 24a hold the member 24b and the frictional members 24c and 24d located at both sides of the member 24b in the axial direction therebetween with pressing force in accordance with elastic force by the elastic member 24e. That is, in the embodiment, limit torque is defined by friction forces that are, generated between the frictional member 24c and the fly wheel 4 and between the frictional member 24d and the member 24a based on the pressing force, as an example. That is, when torque difference between the fly wheel 4 (in the embodiment, input side, as an example) and the first member 2 is larger than a product of the friction force and a moment arm (radius) from the center axis Ax, the first member 2 and the torque limiter portion 24 slide in the rotating direction (circumferential direction).

In the embodiment, the second member 3 includes the supporting portion 31 and a wall portion 32 (plate). An opening 31a is provided on a center portion of the supporting portion 31. The shaft 7 is inserted into the opening 31a. For example, a spline is provided on the supporting portion 31 and the shaft 7 on a portion of the opening 31a. That is, the second member 3 and the shaft 7 are meshed (engaged) with each other at least in the rotating direction (circumferential direction) and the second member 3 and the shaft 7 rotate integrally. The wall portion 32 is extended from an end portion of the supporting portion 31 at the outer side in the radial direction to the outer side in the radial direction. The wall portion 32 is configured to have a circular plate-like shape (circular ring-like shape). The wall portion 32 is extended along the radial direction. The wall portion 32 has a surface 32a and a surface 32b. The surface 32a faces one side in the axial direction and the surface 32b is located at the opposite side to the surface 32a and faces the other side in the axial direction. Openings 32d (in the embodiment, through-holes as an example) are provided on the wall portion 32 at intermediate positions between the center axis Ax (supporting portion 31) and an outer edge 32c (end portion at the outer side in the radial direction). The openings 32d overlap with the openings 21e and 22e provided on the wall portions 21 and 22 in the axial direction. For example, the second member 3 can be made of a metal material (iron-based material, as an example).

In the embodiment, elastic members 8 are interposed between the first member 2 and the second member 3, as an example. Torque (rotation) is transmitted between the first member 2 and the second member 3 through the elastic members 8. The second member 3 can oscillate (be rotationally moved) relatively with respect to the first member 2 in a range where the elastic members 8 can extend and contract. Each elastic member 8 functions as a compression spring that contracts (is elastically deformed, extends and contracts) along the circumferential direction, as an example. The elastic member 8 is a coil spring, as an example. A winding axis of the coil spring (elastic member 8) is approximately along the circumferential direction. Each elastic member 8 is accommodated in the openings 21e, 22e, and 32d overlapped with one another. Respective end portions 8a of the elastic member 8 in the contracting and extending direction (circumferential direction, lengthwise direction) are supported (held) on supporting members 9 (supporting portions, holding portions, holding members, sheets, retainers). The supporting members 9 are supported on the first member 2 or the second member 3. The supporting members 9 can have functions of stably supporting the elastic member 8, elastically deforming the elastic member 8 (causing the elastic member 8 to extend and contract) more stably, and preventing direct contact between the elastic member 8 and the first member 2 or the second member 3, as an example. In the embodiment, in a state where the shafts 6 and 7, the fly wheel 4, and the damper device 1 do not rotate (rotation stop state, standby state), the elastic member 8 and the two supporting members 9 are held between the edge portions of the openings 21e and 22e of the two wall portions 21 and 22 of the first member 2 at both sides in the Circumferential direction, as an example. On the other hand, in a state (rotating state) where the shafts 6 and 7, the fly wheel 4, and the damper device 1 rotate, the elastic member 8 and the two supporting members 9 are held between the edge portions of the openings 21e and 22e of the two wall portions 21 and 22 of the first member 2 at the counterclockwise side and the edge portion of the opening 32d of the wall portion 32 of the second member 3 at the clockwise side. The elastic member 8 extends and contracts in accordance with difference between input torque at the first member 2 side and load torque at the second member 3 side. That is, in the embodiment, when torque variation (variation in torque difference) is generated between the first member 2 and the second member 3, the elastic member 8 elastically contract, as an example. With this contraction, rotational energy based on the torque variation is converted into elastic energy and the elastic energy is temporarily stored in the elastic member 8. The elastic energy temporarily stored in the elastic member 8 is converted into rotational energy (torque) when the elastic member 8 extends elastically. In the embodiment, the elastic members 8, the supporting members 9, and the configurations related thereto are the same at every 90° in the sight line of FIG. 1 (axial direction) but are not limited to the configuration.

In the embodiment, each supporting member 9 has wall portions 91 and 92, projections 93, 94, 95, and 96, and the like, as an example. For example, the supporting member 9 can be made of a synthetic resin material.

In the embodiment, the wall portion 91 is configured to have a plate-like shape having a substantially constant thickness, as an example. The wall portion 91 has a surface 9a facing one side in the circumferential direction and a surface 9b at the opposite side. The wall portion 91 penetrates through three openings 21e, 22e, and 32d. The surface 9a abuts against edges of the openings 21e and 22e and the opening 32d at the circumferential direction side and the surface 9b abuts against the end portion 8a of the elastic member 8. In the embodiment, the surface 9a of the wall portion 91 is an example of a first supporting portion. Further, the surface 9b of the wall portion 91 is an example of a second supporting portion.

In the embodiment, the wall portion 92 projects along the circumferential direction from an end portion of the wall portion 91 at the outer side in the radial direction, as an example. The wall portion 92 has a surface 9c facing the outer side in the radial direction and a surface 9d at the opposite side. The surface 9c opposes or abuts against the edges of the opening 21e, 22e, and 32d at the outer side in the radial direction. That is, the wall portion 92 is interposed between the elastic member 8 and each of the edges of the opening 21e, 22e, and 32d at the outer side in the radial direction. The wall portion 92 can therefore prevent the elastic member 8 from making contact with the first member 2 or the second member 3 at the outer side in the radial direction.

In the embodiment, the projection 93 projects from the surface 9a of the wall portion 91 along the circumferential direction, as an example. A recess 25 is provided on the edges of the opening 21e, 22e, and 32d at the circumferential direction side. The projection 93 is accommodated in the recess 25. The engagement between the projection 93 and the edge of the recess 25 prevents the supporting member 9 from moving (displacing, deviating) at least in the radial direction.

In the embodiment, the projection 94 projects from the surface 9b of the wall portion 91 along the circumferential direction, as an example. The projection 94 projects in a columnar form or a truncated cone form. The projection 94 is accommodated in a coil of the elastic member 8. That is, in the embodiment, the projection 94 can prevent the elastic member 8 from moving (displacing, deviating) in the direction along the surface 9b, as an example. In the embodiment, the projection 94 is also an example of the second supporting portion.

In the embodiment, the projection 95 projects to the outer side in the radial direction from the surface 9c of the wall portion 92. That is, as illustrated in FIG. 2, the projection 95 is located between the two wall portions 21 and 22 and projects into the space S between the wall portions 21 and 22. Slight spaces are provided between the projection 95 and the wall portions 21 and 22. In this configuration, when the supporting member 9 is inclined (falls, rotationally moves, rotationally moves clockwise or counterclockwise in FIG. 2), the projection 95 makes contact with one of the wall portions 21 and 22. This contact prevents the supporting member 9 from being further inclined from a position (posture) at which the projection 95 and the wall portion 21 or 22 make contact with each other. That is, in the embodiment, the projection 95 is an example of a preventing portion.

In the embodiment, the projection 96 projects to the inner side in the radial direction from an end portion of the wall portion 91 at the inner side in the radial direction, as an example. That is, as illustrated in FIG. 2, the projection 96 is located between the two wall portions 21 and 22 and projects into the space S between the wall portions 21 and 22. Slight spaces are provided between the projection 96 and each of the wall portions 21 and 22. In this configuration, when the supporting member 9 is inclined (falls, rotationally moves, rotationally moves clockwise or counterclockwise in FIG. 2) in the axial direction, the projection 96 makes contact with one of the wall portions 21 and 22. This contact prevents the supporting member 9 from being further inclined from a position (posture) at which the projection 96 and the wall portion 21 or 22 make contact with each other. That is, in the embodiment, the projection 96 is also an example of the preventing portion.

As described above, in the embodiment, the supporting member 9 includes the projections 95 and 96 (preventing portions), as an example. In the embodiment, even when the supporting member 9 is inclined (falls) in the axial direction, the projections 95 and 96 make contact with one of the wall portion 21 and 22 so as to prevent the supporting member 9 and the elastic member 8 from being further inclined (falling, rotationally moving) in the axial direction, as an example. With this configuration, in the embodiment, the supporting member 9 and the elastic member 8 are easy to be supported more stably, as an example.

Furthermore, in the embodiment, both of the projections 95 and 96 project into (are located at) the space S between the two wall portions 21 and 22 (wall members). According to the embodiment, the configuration in which the supporting member 9 and the elastic member 8 can be prevented from being inclined in the axial direction can be embodied with a relatively simple configuration in which the supporting member 9 includes the projections 95 and 96 projecting to between the two wall portions 21 and 22, as an example.

In the embodiment, the supporting member 9 includes the plurality of (in the embodiment, two as an example) projections 95 and 96. The projection 95 and the projection 96 are arranged so as to be spaced from each other. In the embodiment, the projection 95 and the projection 96 are arranged so as to be spaced from each other in the radial direction. According to the embodiment, the supporting members 9 (and the elastic members 8) are made more difficult to be inclined in the axial direction than the conventional configuration, as an example. Alternatively, the inclination of each supporting member 9 in the axial direction is easy to be prevented more effectively, as an example.

First Variation

Figure 3:
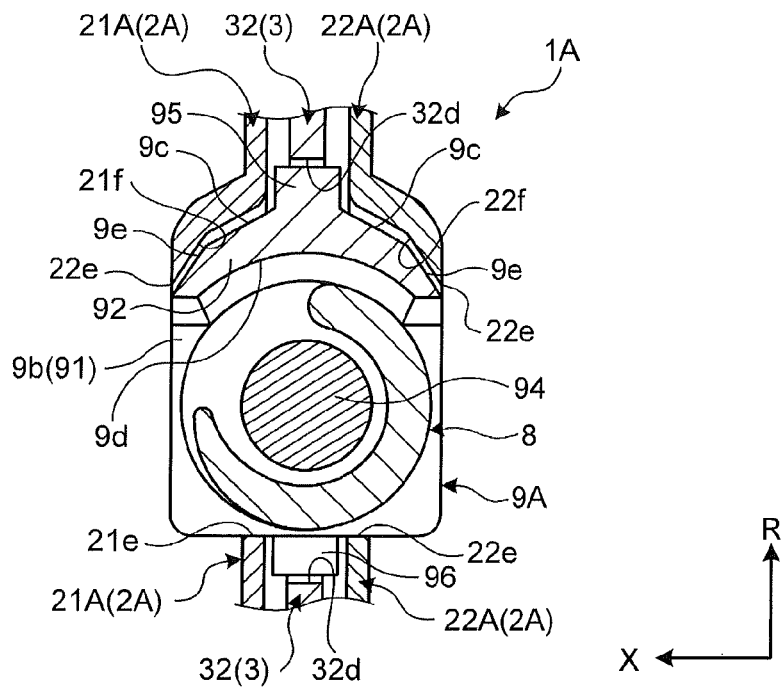
FIG. 3 is a sectional view illustrating an invention main part around a damper in an example of a damper device according to a first variation.

A first variation as illustrated in FIG. 3 has the same configuration as that in the above-mentioned embodiment. The variation can also provide the same result (effect) as that in the above-mentioned embodiment. Note that as illustrated in FIG. 3, in a damper device 1A in the variation, the surface 9c of the wall portion 92 of a supporting member 9A is bent inward in the radial direction on end portions thereof in the axial direction so as to thus form surfaces 9e (inclined surfaces). Wall portions 21A and 22A of a first member 2A have surfaces 21f and 22f facing the surfaces 9e with slight spaces therebetween, respectively. The surfaces 9e and the surfaces 21f and 22f are provided to be inclined with respect to the radial direction. That is, in the variation, even when the supporting member 9A is inclined in the axial direction, contact between each of the surfaces 9e of the supporting member 9A that are inclined with respect to the radial direction and the surfaces 21f and 22f can prevent the supporting member 9A from being further inclined in the axial direction, as an example. With the variation, areas of portions on which the supporting member 9A and the wall portions 21 and 22 make contact with each other tend to be larger than those of the configuration in which portions of the supporting member 9A and the wall portions 21A and 22A along the radial direction make contact with each other, as an example. This tendency causes surface pressures on the portions on which the supporting member 9A and the wall portions 21A and 22A make contact with each other to be smaller, as an example. In the variation, the surfaces 9e of the wall portion 92 are an example of a preventing portion.

Second Variation

Figure 4:
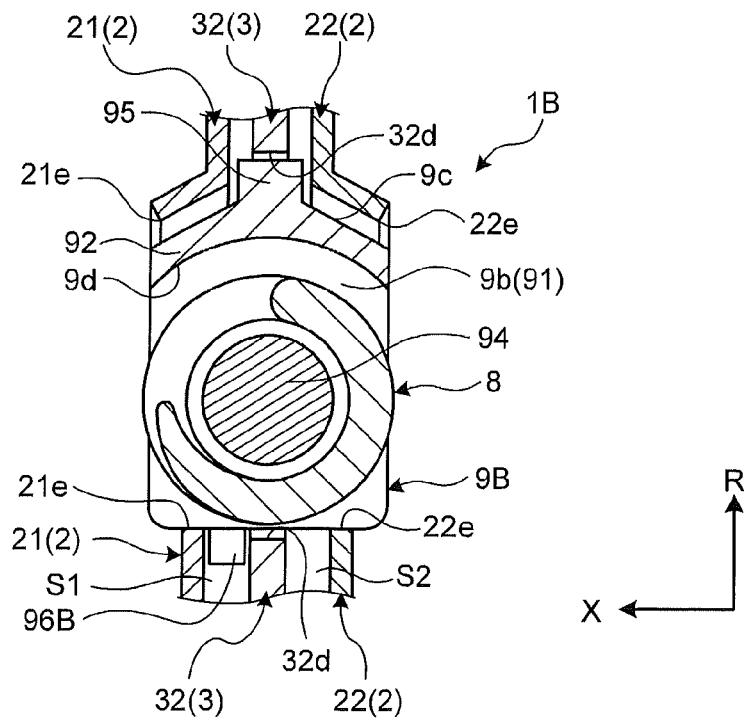
FIG. 4 is a sectional view illustrating an invention main part around a damper in an example of a damper device according to a second variation.

A second variation as illustrated in FIG. 4 has the same configuration as that in the above-mentioned embodiment. The variation can also provide the same result (effect) as that in the above-mentioned embodiment. Note that as illustrated in FIG. 4, in a damper device 1B in the variation, a projection 96B of a supporting member 9B projects into (is located at) a space S1 between the wall portion 21 and the wall portion 32. That is, in the variation, even when the supporting member 9B is inclined in the axial direction, contact between the projection 96B and the wall portion 21 or the wall portion 32 can prevent the supporting member 9B from being further inclined in the axial direction, as an example. In the variation, the projection 96B is an example of a preventing portion. It should be noted that the projection 96B may be configured to project into (be located at) a space S2 between the wall portion 22 and the wall portion 32.

Third Variation

Figure 5:
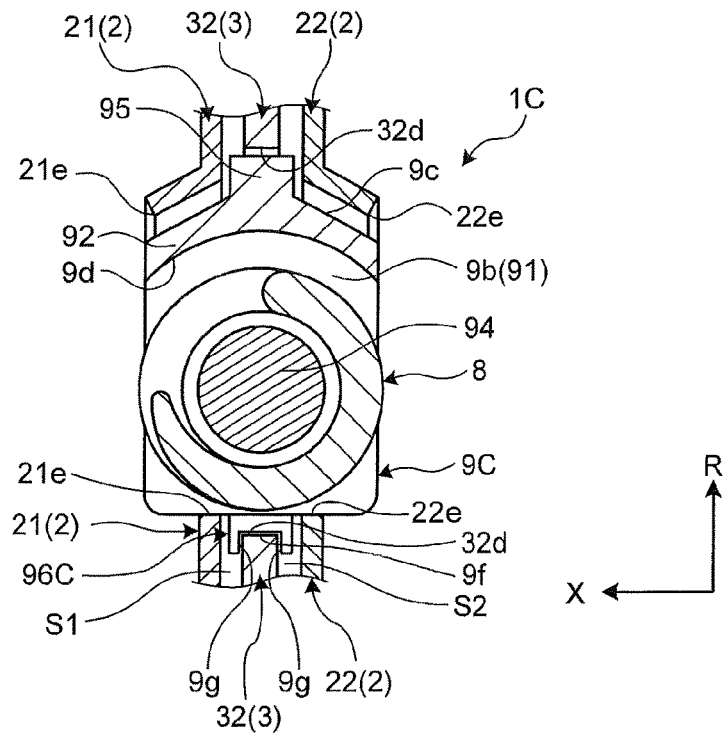
FIG. 5 is a sectional view illustrating an invention main part around a damper in an example of a damper device according to a third variation.

A third variation as illustrated in FIG. 5 has the same configuration as that in the above-mentioned embodiment. The variation can also provide the same result (effect) as that in the above-mentioned embodiment. Note that as illustrated in FIG. 5, in a damper device 1C in the variation, a recess 9f is provided on a projection 96C of a supporting member 9C. The wall portion 32 is inserted into the recess 9f. That is, in the variation, even when the supporting member 9C is inclined in the axial direction, contact between a surface 9g of the recess 9f and the wall portion 32 can prevent the supporting member 9C from being further inclined in the axial direction, as an example. In the variation, the projection 96C is an example of a preventing portion. It should be noted that the wall portion 21 or the wall portion 22 may be configured to be inserted into the recess 9f. Alternatively, a plurality of members of the wall portions 21 and 22 and the wall'portion 32 may be configured to be inserted into the recess 9f.

Fourth Variation

Figure 6:
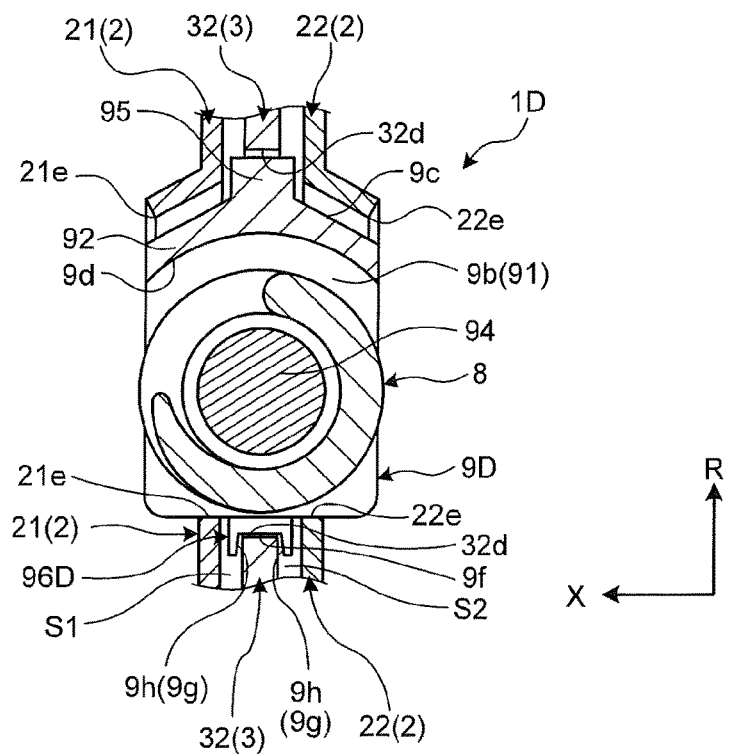
FIG. 6 is a sectional view illustrating an invention main part around a damper in an example of a damper device according to a fourth variation.

A fourth variation as illustrated in FIG. 6 has the same configuration as that in the above-mentioned embodiment. The variation can also provide the same result (effect) as that in the above-mentioned embodiment. In a damper device 1D in the variation, the recess 9f is also provided on a projection 96D of a supporting member 9D in the same manner as the third variation. Note that in the variation, as illustrated in FIG. 6, an expansion portion 9h (surface 9g) on which the width of the recess 9f is enlarged toward the opening side of the recess 9f is provided on the recess 9f. According to the variation, the wall portion 32 is easy to be inserted into the recess 9f at the time of assembly and the like, as an example. In the variation, although the recess 9f is formed as the expansion portion 9h as a whole, the expansion portion 9h may be configured to be provided on an end portion of the recess 9f at the opening side.

Hereinbefore, the embodiment and the variations of the invention have been described. The above-mentioned embodiment and the variations are merely examples and do not intend to limit a range of the invention. The embodiment and the variations can be executed in various other modes and various omissions, replacements, combinations, and changes can be made in a range without departing from the scope of the invention. The embodiment and the variations can be executed while the configurations and the shapes in the embodiment and the variations are partially exchanged. Furthermore, the embodiment and the variations can be executed with specifications (configurations, types, directions, shapes, sizes, lengths, widths, thicknesses, heights, numbers, arrangements, positions, materials, and the like) of the individual components, the shapes, display elements, and the like changed appropriately. For example, the embodiment and the variations can be executed with the shape and the layout of the preventing portion variously changed.

EXPLANATIONS OF LETTERS OR NUMERALS 1, 1A to 1D DAMPER DEVICE
2,2A FIRST MEMBER
3 SECOND MEMBER
8 ELASTIC MEMBER
9, 9A to 9D SUPPORTING' MEMBER
9a SURFACE (FIRST SUPPORTING PORTION)
9b SURFACE (SECOND SUPPORTING PORTION)
9e SURFACE (INCLINED SURFACE)
9f RECESS
9g SURFACE
9h EXPANSION PORTION
21, 21A, 22, 22A WALL PORTION (WALL MEMBER)
94 PROJECTION (SECOND SUPPORTING PORTION)
95 PROJECTION (PREVENTING PORTION)
96, 96B to 96D PROJECTION (PREVENTING PORTION)
Ax CENTER AXIS (ROTATING AXIS)

The invention claimed is:
1. A damper device comprising:
a first member that has two wall members separated from each other in an axial direction of a rotating axis and rotates about the rotating axis, the first member being provided with an opening having a first recess at a circumferential edge of the opening of the first member, the first recess being depressed in a circumferential direction;

a second member that is located between the two wall members and rotates about the rotating axis, the second member being provided with an opening having a second recess at a circumferential edge of the opening of the second member, the second recess being depressed in the circumferential direction;

an elastic member that is interposed between the first member and the second member and is elastically deformed at least in a circumferential direction of the rotating axis between the first member and the second member;

a supporting member including a first supporting portion, a second supporting portion, a projection, and a preventing portion, the first supporting portion being supported by at least one of the first member and the second member, the second supporting portion supporting the elastic member, and the preventing portion making contact with at least one of the two wall members and the second member so as to prevent the supporting member from being inclined in the axial direction, the projection projecting from the first supporting portion in the circumferential direction and being accommodated in the first recess and the second recess.

2. The damper device according to claim 1, wherein the preventing portion projects to between two members out of the two wall members and the second member and makes contact with at least one of the two members so as to prevent the supporting member from being inclined in the axial direction.

3. The damper device according to claim 1, wherein the supporting member includes a plurality of the preventing portions separated from one another in a radial direction of the rotating axis.

4. The damper device according to claim 1, wherein the preventing portion has an inclined surface inclined with respect to a radial direction.

5. A damper device comprising:
a first member that has two wall members separated from each other in an axial direction of a rotating axis and rotates about the rotating axis;
a second member that is located between the two wall members and rotates about the rotating axis;
an elastic member that is interposed between the first member and the second member and is elastically deformed at least in a circumferential direction of the rotating axis between the first member and the second member;
a supporting member including a first supporting portion, a second supporting portion, and a preventing portion, the first supporting portion being supported by at least one of the first member and the second member, the second supporting portion supporting the elastic member, and the preventing portion making contact with at least one of the two wall members and the second member so as to prevent the supporting member from being inclined in the axial direction;
the preventing portion being provided with a recess wherein one member out of the two wall members and the second member is inserted into the recess;
the recess of the preventing portion and the one member making contact with each other so as to prevent the supporting member from being inclined in the axial direction; and
the recess being provided with an expansion portion where the recess expands toward an opening side thereof.

6. The damper device according to claim 5, wherein the preventing portion projects to between two members out of the two wall members and the second member and makes contact with at least one of the two members so as to prevent the supporting member from being inclined in the axial direction.

7. The damper device according to claim 5, wherein the supporting member includes a plurality of the preventing portions separated from one another in a radial direction of the rotating axis.

8. The damper device according to claim 5, wherein the preventing portion has an inclined surface inclined with respect to a radial direction.

* * * * *